Figure 1:
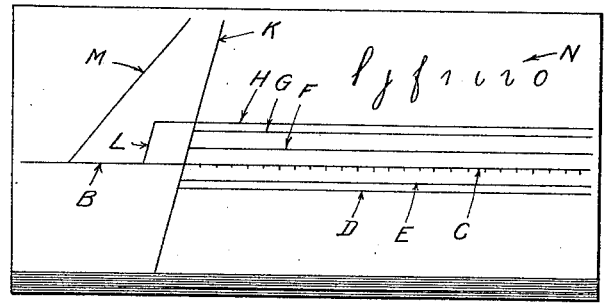

G. T. SPAULL.
DEVICE FOR TEACHING WRITING.
APPLICATION FILED FEB. 8, 1918.

1,324,182.

Patented Dec. 9, 1919.

Inventor
G. T. Spaull
By H. R. Kerslake
Atty

UNITED STATES PATENT OFFICE.

GEORGE THOMAS SPAULL, OF RANDWICK, NEAR SYDNEY, NEW SOUTH WALES, AUSTRALIA.

DEVICE FOR TEACHING WRITING.

1,324,182. Specification of Letters Patent. Patented Dec. 9, 1919.

Application filed February 8, 1918. Serial No. 216,072.

*To all whom it may concern:*

Be it known that I, GEORGE THOMAS SPAULL, subject of the King of Great Britain and Ireland, residing at "Greenagh," Hodgson Street, Randwick, near Sydney, New South Wales, Australia, have invented new and useful Improvements in Devices for Teaching Writing, of which the following is a specification.

This invention consists in a device usable by a pupil for the purpose of assisting him in correctly forming, proportioning and spacing and writing characters, and usable by a pupil or a master for checking the correctness of a pupil's exercises in writing. Imperfections in hand writing are most noticeable in respect of incorrect sloping, spacing, and proportionating the size of the letters or other characters used, and it is desirable to instruct students of the importance of correctness in those details irrespectively of correctness in the shaping of the individual characters. Utility of copy books for this purpose is limited, as the pupil's work can not be critically compared with the headline, and at best copy book practice is an attempted copy of the headline and does not represent an effort at independent reproduction of the substance of the headline, so that the same work written apart from the copy book would exhibit the like characteristics.

My invention aims at providing a means whereby the student is enabled to write exercises independently of a copy book from dictation or printed matter, and to conform his writing to a definite standard represented in a device which the student may himself use for the purpose of assisting him in his work and checking the correctness of it.

The device consists of a slip of transparent celluloid having marked upon it certain parallel horizontal lines and certain angularly disposed vertical lines, and having also represented upon it the forms of the elementary sections of the letters used in handwriting. The horizontal lines determine the vertical lengths of the characters both in the body portions and in the head and tail portions thereof, graduations on the base line serve to indicate correct spacing according to a unit system; the angular lines indicate the angular directions of the up and down strokes in the head and tail portions and the stem portions of the characters, a rhombus block formed by certain of the horizontal and angular lines offering an indication of the appropriate area which should be occupied by a capital letter. The elemental curves serve to indicate the proper shape for loops and other parts of the characters. One of the inclined vertical lines suggests the proper angle for the letter bodies, and for the down strokes of the head and tail loops, while the other vertically disposed line indicates the proper angle for the upstroke portions of the heads and tails of the characters.

Figure 2:

Figure 1 of the accompanying drawing is a plan view of the device, and Fig. 2, a transverse section. It is a thin rectangular sheet of transparent celluloid, which is preferably but not necessarily formed with a thickened lower edge A by means of which it may be conveniently slid against the top edge of a desk ruler. Upon this sheet certain lines, marks, and loops are printed as follows:—

Horizontal lines.

A base line B from edge to edge of the sheet, marked off into letter spaces by a series of equidistant spots C;

Two tail lines D and E forming gages for long and short letter tails respectively;

Two cap lines F and G forming gages respectively for letter body heights and for short upper loops and strokes.

One cap line H for long upper loops and strokes and for heights of capital letters.

All these horizontal lines, D, E, F, G and H extend from an angularly disposed vertical line K to the right hand edge of the device. The line H is extended leftward of the line K a distance equal to the proper width of a capital letter, a vertical line L completing a rhombus figure which forms an area within which a capital letter should be inclosable.

In addition to the angular line K which determines the normal angularity of the letters, a more inclined slope line M is printed in the space rearward of the rhombus figure to form a guide for angularity of loops and other upstrokes.

In the upper part of the device above the horizontal lines, elements N are printed. These comprise the elementary segments of letter forms and serve as guides for the correct structure of individual parts of letters.

By constant reference to these elementary forms of letter parts and testing the work done by superposing the device over it so that the pen lines are observed through the transparency under the standard curves printed thereon, the student learns to "synthesize" the letters correctly, acquires the habit of disregarding conventional letter shapes which he is otherwise wont to form, and becomes habituated to forming letters in correct size and spacing and writing them on a uniform slope or angle, and so is rapidly tutored in uniformity regularity, neatness, and clearness in writing.

What I claim as my invention and desire to secure by Letters Patent is:—

1. A device for teaching and examining handwriting, comprising a sheet of transparent material provided with a horizontal base line having graduations forming letter spaces, a second horizontal line arranged above and spaced away from the base line forming a gage for body heights of small letters, a third line arranged above and spaced away from the second line for gaging short upper loops and strokes of small letters, an inclined vertical line crossing the base line for indicating the normal angularity of letters, and a second inclined line spaced away from the other inclined line and extending parallel thereto, the space between the inclined lines acting as a gage for measuring the width of capital letters.

2. A device for teaching and examining handwriting, comprising a sheet of transparent material provided with a horizontal base line having graduations forming letter spaces, a second horizontal line arranged above and spaced away from the base line forming a gage for body heights of small letters, a third line arranged above and spaced away from the second line for gaging short upper loops and strokes of small letters, and another line arranged beneath the first line for gaging the tails of certain letters.

3. A device for teaching and examining handwriting, comprising a sheet of transparent material provided with a horizontal base line having graduations forming letter spaces, a second horizontal line arranged above and spaced away from the base line forming a gage for body heights of small letters, a third line arranged above and spaced away from the second line for gaging short upper loops and strokes of small letters, a plurality of horizontal lines arranged below the base line for gaging the long and short tails of certain letters, and an inclined vertical line crossing the base line for indicating the normal angularity of letters.

4. A device for teaching and examining handwriting, comprising a sheet of transparent material provided with a horizontal base line having graduations forming letter spaces, a second horizontal line arranged above and spaced away from the base line forming a gage for body heights of small letters, a third line arranged above and spaced away from the second line for gaging short upper loops and strokes of small letters, a plurality of horizontal lines arranged below the base line for gaging the long and short tails of certain letters, an inclined line arranged above the base line to form a guide for angularity of loops and other upstrokes, and an inclined line crossing the base line for indicating the normal angularity of letters.

5. In a device of the kind set forth in claim 4, a transparent sheet provided at one edge with a reinforcement forming a rule edge and a means for handling the device.

In testimony whereof I have signed my name to this specification in the presence of two subscribing witnesses.

GEORGE THOMAS SPAULL.

Witnesses:
W. J. HUMPHREYS,
H. C. CAMPBELL.